United States Patent
Gonze et al.

(10) Patent No.: US 8,733,084 B2
(45) Date of Patent: May 27, 2014

(54) BYPASS HC-$NO_x$ ADSORBER STRATEGY

(75) Inventors: Eugene V. Gonze, Pinckney, MI (US);
Halim G. Santoso, Novi, MI (US)

(73) Assignee: GM Global Technology Operations LLC

( * ) Notice: Subject to any disclaimer, the term of this patent is extended or adjusted under 35 U.S.C. 154(b) by 137 days.

(21) Appl. No.: 13/302,652

(22) Filed: Nov. 22, 2011

(65) Prior Publication Data

US 2013/0125530 A1  May 23, 2013

(51) Int. Cl.
*F01N 3/00* (2006.01)
*F01N 3/08* (2006.01)

(52) U.S. Cl.
CPC ............ *F01N 3/0807* (2013.01); *F01N 3/0878* (2013.01); *F01N 3/0821* (2013.01)
USPC ................... 60/287; 60/274; 60/292; 60/297; 60/299; 60/301

(58) Field of Classification Search
CPC ........... F01N 3/08; F01N 3/20; F01N 3/0807; F01N 38/0814; F01N 3/0871; F01N 3/0878; F01N 3/0821
USPC ........... 60/274, 284, 287, 289, 292, 297, 299, 60/301, 324
See application file for complete search history.

(56) References Cited

U.S. PATENT DOCUMENTS

| | | | | |
|---|---|---|---|---|
| 6,397,586 | B1 * | 6/2002 | Sakurai et al. | 60/288 |
| 6,401,451 | B1 * | 6/2002 | Yasui et al. | 60/277 |
| 7,444,803 | B2 * | 11/2008 | Iwamoto et al. | 60/288 |
| 7,987,935 | B2 * | 8/2011 | Ichimoto | 180/65.28 |
| 2005/0220679 | A1 * | 10/2005 | Choi | 422/177 |
| 2006/0242947 | A1 * | 11/2006 | Kay et al. | 60/284 |

* cited by examiner

*Primary Examiner* — Binh Q Tran

(57) ABSTRACT

A bypass HC—$NO_x$ system includes a $NO_x$ conversion control module that generates a signal indicating whether a close coupled catalyst is active. The system further includes a bypass valve control module that, in response to the signal, opens a bypass valve located in an active HC—$NO_x$ adsorber assembly to purge hydrocarbons from an HC adsorber, wherein the bypass valve is located upstream from the HC adsorber and a $NO_x$ adsorber. The bypass valve control module also determines a temperature of a three way catalyst and closes the bypass valve to purge nitrogen dioxide from the $NO_x$ adsorber if the temperature of the three way catalyst is greater than a predetermined temperature threshold.

18 Claims, 3 Drawing Sheets

_BYPASS HC-NO$_x$ ADSORBER STRATEGY_

FIELD

The present disclosure relates to cold start emission strategies, and more particularly to integration of NOx adsorber and HC adsorber devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Ignition of a compressed air/fuel mixture in a cylinder of the engine results in combustion. Exhaust gas resulting from the combustion of the air/fuel mixture is expelled to an exhaust system. One or more engine parameters affecting the quantities of air and fuel in the air/fuel mixture may be adjusted based on signals from various sensors that are located in the exhaust system. The temperature of the engine also affects the quantities of air and fuel in the air/fuel mixture. For example, during a cold start of the engine, the air/fuel mixture may be more heavily concentrated with fuel and then become less concentrated as the temperature of the engine increases.

SUMMARY

A bypass HC—NO$_x$ system includes a NO$_x$ conversion control module that generates a signal indicating whether a close coupled catalyst is active. The system further includes a bypass valve control module that, in response to the signal, opens a bypass valve located in an active HC—NO$_x$ adsorber assembly to purge hydrocarbons from an HG adsorber, wherein the bypass valve is located upstream from the HC adsorber and a NO$_x$ adsorber. The bypass valve control module also determines a temperature of a three way catalyst and closes the bypass valve to purge nitrogen dioxide from the NO$_x$ adsorber if the temperature of the three way catalyst is greater than a predetermined temperature threshold.

A bypass HC—NO$_x$ adsorber method includes opening a bypass valve located in an active HC—NO$_x$ adsorber assembly to purge hydrocarbons out of an HC adsorber, wherein the bypass valve is located upstream from the HC adsorber and a NO$_x$ adsorber. The method further includes determining a temperature of a three way catalyst and closing the bypass valve to purge nitrogen dioxide out of the NO$_x$ adsorber if the temperature of the three way catalyst is greater than a predetermined temperature threshold.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
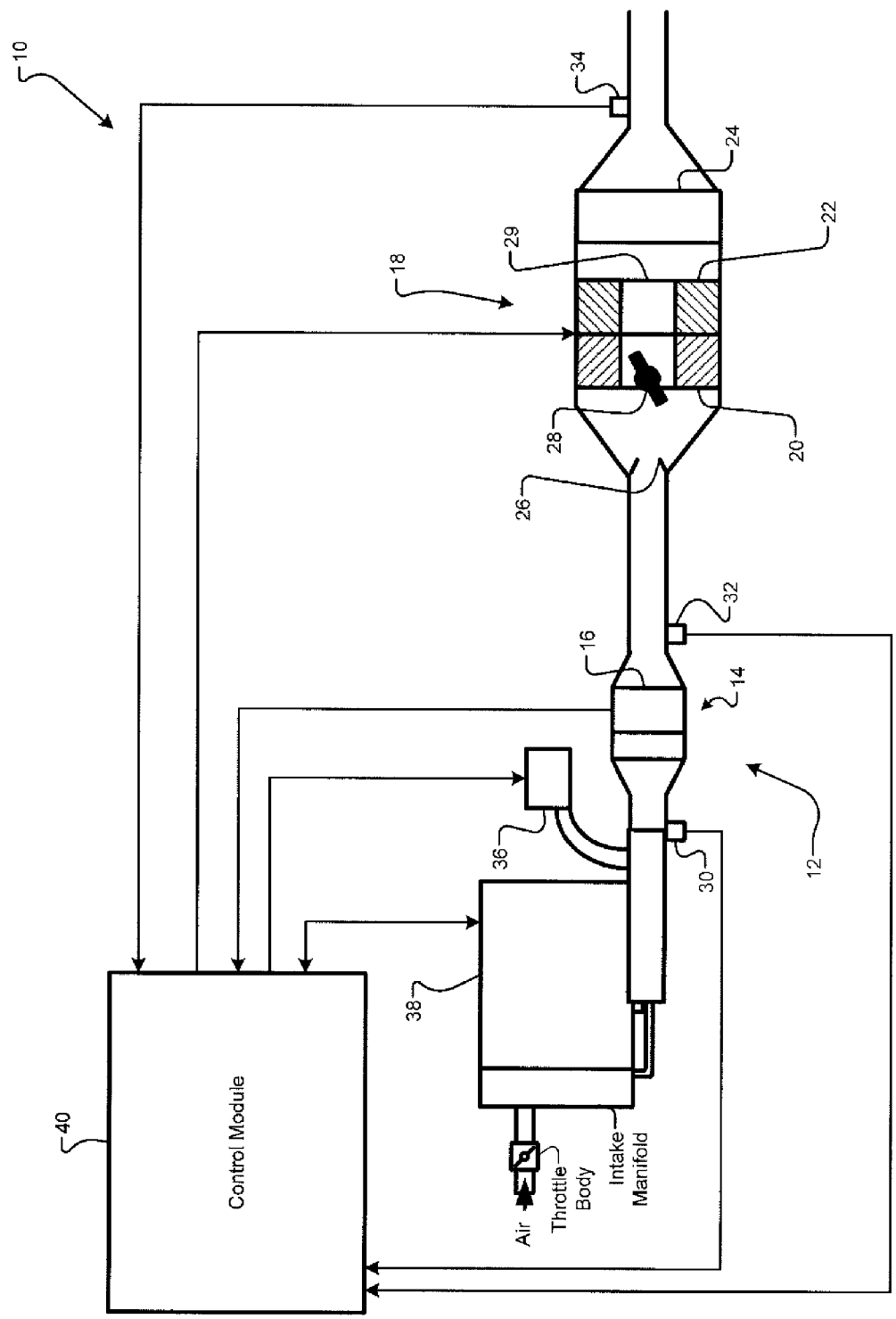
FIG. 1 is a schematic illustration of an exhaust assembly according to the present disclosure.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors or a group of execution engines. For example, multiple cores and/or multiple threads of a processor may be considered to be execution engines. In various implementations, execution engines may be grouped across a processor, across multiple processors, and across processors in multiple locations, such as multiple servers in a parallel processing arrangement. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Referring to FIG. 1, an exhaust assembly 10 according to the present disclosure includes a close coupled catalyst 12 including a palladium-based three-way catalyst 14. The palladium-based three-way catalyst 14 includes a palladium portion 16 used to convert nitric oxide (NO) to nitrogen dioxide (NO$_2$). The exhaust assembly 10 further includes an active HC—NO$_x$ adsorber assembly 18. The adsorber assembly 18 includes a nitrogen oxides (NO$_x$) adsorber 20, a hydrocarbon (HC) adsorber 22, and a three-way catalyst 24. The NO$_x$ adsorber 20 and HC adsorber 22 are both cylindrical in shape. It is noted that FIG. 1 is a cross-sectional view of the adsorbers 20, 22. The adsorber assembly 18 further includes a venturi tube 26 and a bypass valve 28 to control airflow into the adsorber assembly 18. The venturi tube 26 is a cylindrical tube connected to an inlet of the adsorber assembly 18, downstream from the close coupled catalyst 12. The venturi tube 26 directs airflow to the center of the adsorber assembly 18. The bypass valve 28 is a valve positioned upstream from the HC adsorber 22 and the $NO_x$ adsorber 20. The bypass valve 28 closes to force airflow through the adsorbers 20, 22 and opens to allow airflow to bypass the adsorbers 20, 22 through an opening 29 in the center of the cylindrical adsorbers. When fully closed, the bypass valve must have a leak rate of less than a predetermined leak threshold (for example only, 5 percent). An engine oxygen sensor 30 and a post catalyst oxygen sensor 32 sense the air/fuel ratio of the exhaust gas flowing through the exhaust assembly 10. A temperature sensor 34 senses the temperature of the exhaust gas exiting the three-way catalyst 24. An air pump 36 may be used to force exhaust gas through the exhaust assembly 10. However, it is understood that the exhaust assembly 10 is operable without the assistance of an air pump 36.

The exhaust assembly 10 is connected to an engine 38 and receives exhaust gases produced from combustion. A control module 40 receives signals from each of the close coupled catalyst 12, the engine oxygen sensor 30, the post catalyst oxygen sensor 32, the temperature sensor 34 and the engine 38 and sends signals to the adsorber assembly 18, the air pump 36, and the engine 38. For example, the control module 40 sends a signal to the adsorber assembly 18 to open and close the bypass valve 28.

The palladium-based three-way catalyst 14 is operational during a cold start of the engine 38. The palladium portion 16 of the palladium-based three-way catalyst 14 contains a catalyst (for example only, perovskite or platinum) that bonds with the NO to form $NO_2$. The $NO_2$ is stored in the $NO_x$ adsorber 20. The $NO_x$ adsorber 20 and HC adsorber 22 store $NO_2$ and HC for separate release into the exhaust gas. Accordingly, the HC adsorber 22 is located downstream of the $NO_x$ adsorber 20. The HC is purged into the exhaust gas stream before the $NO_2$ is purged. If any HC is present in the $NO_x$ adsorber 20, the $NO_2$ will convert back to NO.

The venturi tube 26 is located at an inlet of the adsorber assembly 18 and directs exhaust flow to the center of the adsorber assembly 18. When the bypass valve 28 is open, the exhaust gas will flow through the opening 29 in the cylindrical $NO_x$ adsorber 20 and HC adsorber 22. The exhaust gas passes through the three-way catalyst 24 and exits the exhaust assembly 10. When the bypass valve 28 is closed, the exhaust gas will flow through the $NO_x$ adsorber 20 and the HC adsorber 22.

Figure 2:
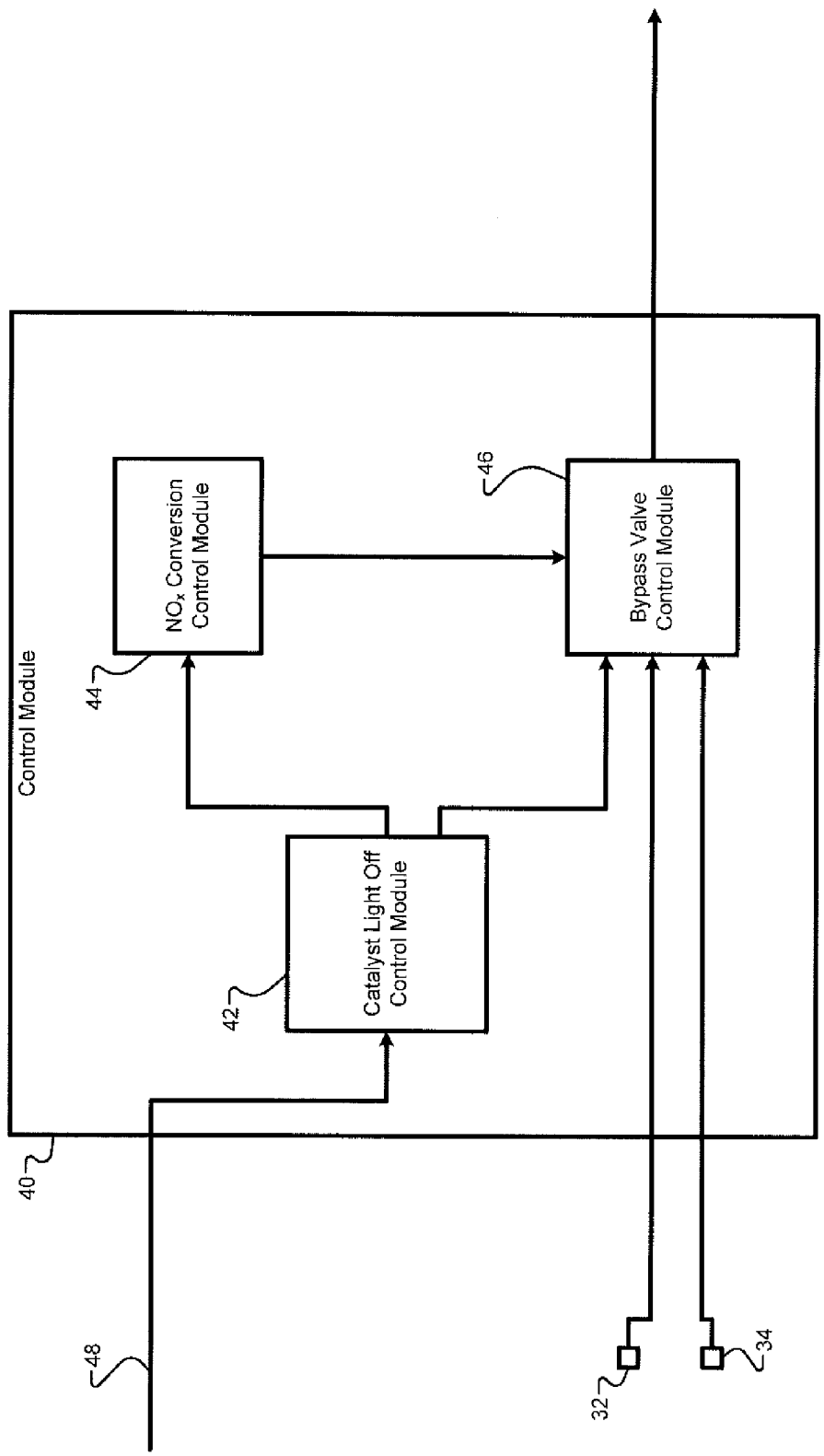
FIG. 2 is a schematic illustration of a control module implementing a bypass HC—NOx adsorber system according to the present disclosure.

Referring now to FIG. 2, the control module 40 includes a catalyst light off control module 42, a $NO_x$ conversion control module 44, and a bypass valve control module 46. The catalyst light off control module 42 receives engine signals 48 (for example only, engine coolant temperature, engine run time, and/or engine speed) indicating the status of the engine 38 and determines whether the engine 38 is running in a catalyst light off mode. For example, the engine is running in the catalyst light off mode if an engine run timer is less than a predetermined time threshold (for example only, 80 seconds) and a coolant temperature is less than a predetermined coolant temperature threshold (for example only, 70° C.). The catalyst light off control module 42 sends a signal indicating the status of the engine 38 to the $NO_x$ conversion control module 44 and the bypass valve control module 46. Further, the catalyst light off control module 42 implements a catalyst light off strategy in the engine 38 to meet federal emissions requirements. For example, the catalyst light off strategy occurs while the engine is in the catalyst light off mode and may include activation of the air pump 36, retardation of a spark timing to create hot exhaust gas, and a high idle engine speed to increase exhaust flow to the adsorber assembly 18.

The $NO_x$ conversion control module 44 receives the signal from the catalyst light off control module 42 and determines whether the catalyst (for example, perovskite or platinum) is converting NO to $NO_2$ in the palladium based three-way catalyst 14. The $NO_2$ is later stored in the NOx adsorber 20. The $NO_x$ conversion control module 44 sends a signal to the bypass valve control module 46 indicating whether the close coupled catalyst 12 is active. The close coupled catalyst 12 is active if NO is actively being converted to $NO_2$ in the palladium based three-way catalyst 14.

The bypass valve control module 46 receives the signal from the catalyst light off control module 42 and the $NO_x$ conversion control module 44 indicating that the engine is in the catalyst light off mode and that the close coupled catalyst is actively converting NO to $NO_2$. The bypass valve control module 46 also receives signals from the post catalyst oxygen sensor 32 and the temperature sensor 34. The bypass valve control module 46 determines whether the temperature of the three-way catalyst is greater than a predetermined temperature threshold (for example only, 350° C.) and whether the signal from the post catalyst oxygen sensor 32 indicates that the emissions gas is rich. The emissions gas is rich when the air/fuel ratio is less than stoichiometric (there is a greater quantity of fuel in the emissions gas) and emissions gas is lean if the air/fuel ratio is greater than stoichiometric (there is less fuel in the emissions gas). The bypass valve control module 46 will indicate that the emissions gas is rich if the signal from the post catalyst oxygen sensor 32 is greater than a predetermined voltage threshold (for example only, 500 millivolts (mV)).

The bypass valve control module 46 opens and closes the bypass valve 28. A closed bypass valve 28 blocks the passage of emission gas through the center of the adsorber assembly 18 and forces the emission gas to pass through the $NO_x$ adsorber 20 and the HC adsorber 22. An open bypass valve 28 allows the flow of emission gas through the center of the adsorber assembly 18. The catalyst control module 46 closes the bypass valve 28 either to force accumulation of HC in the HC adsorber 22 and $NO_2$ in the $NO_x$ adsorber 20 or to purge the $NO_x$ adsorber of previously accumulated $NO_2$. The catalyst control module 46 opens the bypass valve 28 to purge HC from the HC adsorber and when the engine is not in the catalyst light off mode.

Figure 3:
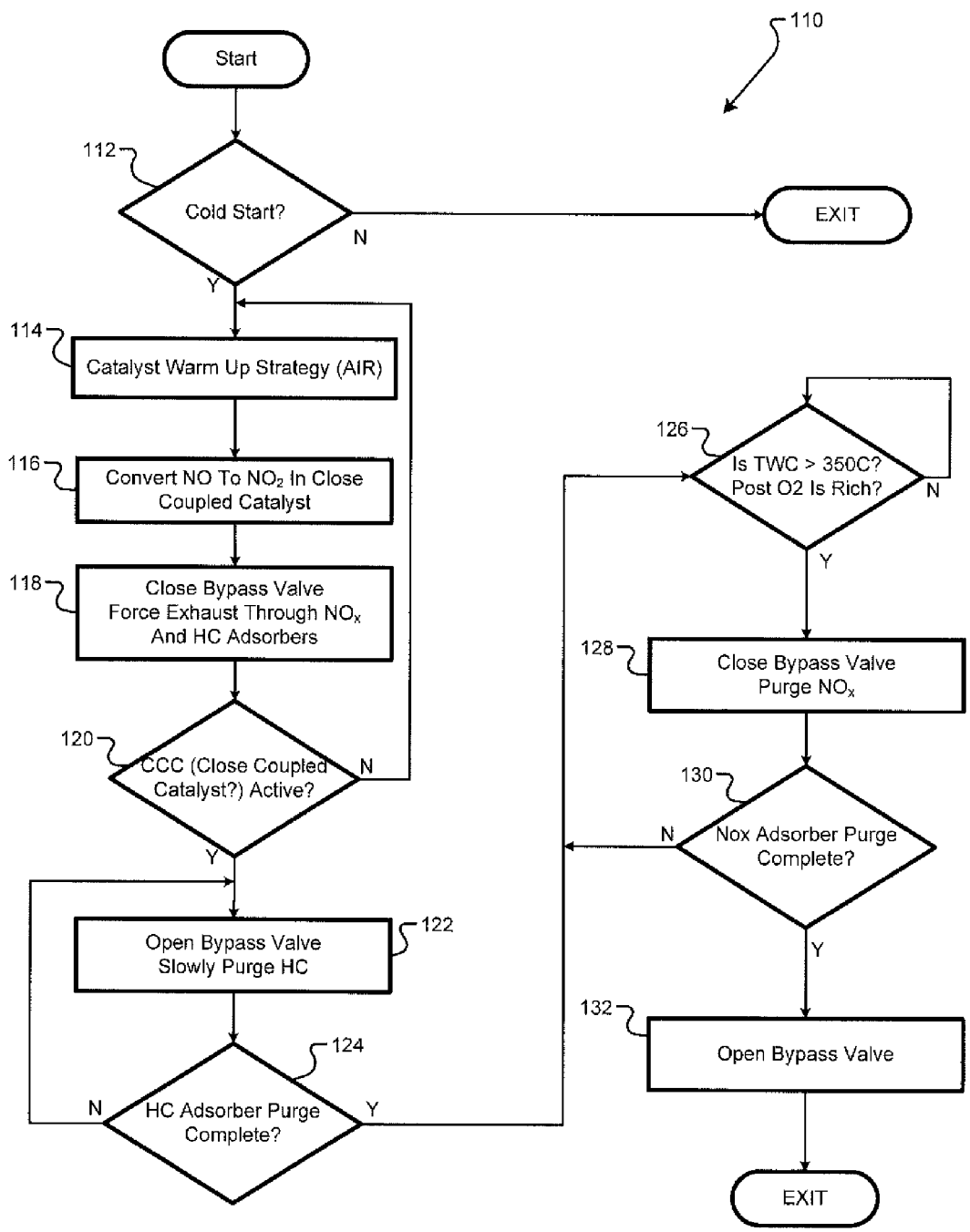
FIG. 3 is a flow diagram of bypass HC—NOx adsorber method according to the present disclosure.

Referencing FIG. 3, the method 110 according to the present disclosure begins at 112 and determines whether the engine 38 is in a cold start mode. At 112, the method 110 determines whether the engine is operating in the catalyst light off mode. If false, the engine 38 is not in the cold start mode and the method 110 exits. If true, the engine 38 is in the cold start mode and a catalyst warm up strategy is initiated at 114. The catalyst warm up strategy may include activation of the air pump 36 to force exhaust gas through the exhaust assembly 10.

At 116, the NO is converted to $NO_2$ in the palladium-based three-way catalyst. The bypass valve 28 is closed at 118, forcing the exhaust gas to pass through the $NO_x$ adsorber 20 and HC adsorber 22. At 120, the method 110 determines whether the close coupled catalyst 12 is active. The close coupled catalyst 12 is active if a catalyst (for example only, perosvkite or platinum) is actively converting NO to $NO_2$ in the palladium-based three-way catalyst 14. If false, the method 110 returns to 114 and initiates the catalyst warm up strategy. If true, the bypass valve 28 is opened and the HC is slowly purged from the HC adsorber 22 at 122.

At 124, the method 110 evaluates whether the HC has completely purged from the HC adsorber 22. If false, the method 110 returns to 122 and opens the bypass valve 28 to slowly purge HC. If true, the method 110 proceeds to 126 and evaluates whether the temperature of the three-way catalyst 24 is greater than the predetermined temperature threshold and whether the post catalyst oxygen sensor 32 is greater than the predetermined voltage threshold. If false, the method 110 continues reading the temperature of the three way catalyst 24 and the reading from the post catalyst oxygen sensor 32 until the readings satisfy the requirements at 126. If true, the bypass valve 28 is closed to force exhaust gas through the $NO_x$ adsorber 20 and purge $NO_2$ from the $NO_x$ adsorber 20 at 128.

At 130, the method 110 evaluates whether $NO_2$ has been completely purged from the $NO_x$ adsorber 20. Purge is complete if an amount of nitrogen dioxide in the $NO_x$ adsorber 20 is below a predetermined nitrogen dioxide threshold (for example only, 10%). If false, the method 110 returns to 126 to evaluate the temperature of the three-way catalyst 24 and the reading from the post catalyst oxygen sensor 32. If true, the bypass valve 28 is opened to allow flow of exhaust gas through the center of the catalyst 18 at 132. The method 110 then exits.

After the method 110 exits, the exhaust assembly 10 resumes normal operating conditions. The exiting of the method 110 indicates that the exhaust assembly 10 is no longer operating in the cold start mode. For example, the bypass valve 28 remains in an open position for the remainder of the engine-on condition. The bypass valve 28 may only be closed during cold start procedures to force exhaust gas through the $NO_x$ adsorber 20 and HC adsorber 22.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system comprising:
    a $NO_x$ conversion control module that generates a signal indicating whether a close coupled catalyst is active; and
    a bypass valve control module that:
        in response to the signal, opens a bypass valve located in an active HC—$NO_x$ adsorber assembly to purge hydrocarbons from an HC adsorber, wherein the bypass valve is located upstream from the HC adsorber and a $NO_x$ adsorber, and wherein the HC adsorber is located downstream of the $NO_x$ adsorber;
        determines a temperature of a three-way catalyst; and
        closes the bypass valve to purge nitrogen dioxide from the $NO_x$ adsorber if the temperature of the three-way catalyst is greater than a predetermined temperature threshold.

2. The system of claim 1, wherein nitrogen dioxide accumulates in the $NO_x$ adsorber and hydrocarbons accumulate in the HC adsorber.

3. The system of claim 1, wherein the bypass valve control module purges the HC adsorber if the close coupled catalyst is active.

4. The system of claim 1, wherein the bypass valve control module purges the $NO_x$ adsorber if a post catalyst oxygen sensor reading is greater than a predetermined threshold.

5. The system of claim 1, further comprising a venturi tube that directs exhaust gas to the HC adsorber if the bypass valve is open.

6. The system of claim 1, wherein exhaust gas is forced through the $NO_x$ adsorber and the HC adsorber if the bypass valve is closed.

7. The system of claim 1, wherein the bypass valve control module opens the bypass valve if the purge of the $NO_x$ adsorber is complete, wherein the purge is complete if an amount of nitrogen dioxide in the $NO_x$ adsorber is below a predetermined nitrogen dioxide threshold.

8. The system of claim 1, further comprising a catalyst light off control module that initializes a catalyst warm up strategy if an engine is in a catalyst light off mode.

9. The system of claim 8, wherein the catalyst light off control module activates an air pump if the engine is in the catalyst light off mode.

10. A method comprising:
    opening a bypass valve located in an active HC—$NO_x$ adsorber assembly to purge hydrocarbons out of an HC adsorber, wherein the bypass valve is located upstream from the HC adsorber and a $NO_x$ adsorber, and wherein the HC adsorber is located downstream of the $NO_x$ adsorber;
    determining a temperature of a three-way catalyst; and
    closing the bypass valve to purge nitrogen dioxide out of the $NO_x$ adsorber if the temperature of the three-way catalyst is greater than a predetermined temperature threshold.

11. The method of claim 10, wherein nitrogen dioxide accumulates in the $NO_x$ adsorber and hydrocarbons accumulate in the HC adsorber.

12. The method of claim 10, wherein the HC adsorber is purged if a close coupled catalyst is active.

13. The method of claim 10, wherein the $NO_x$ adsorber is purged if a post catalyst oxygen sensor reading is greater than a predetermined threshold.

14. The method of claim 10, further comprising directing exhaust gas to the HC adsorber using a venturi tube if the bypass valve is open.

15. The method of claim 10, further comprising forcing exhaust gas through the $NO_x$ adsorber and the HC adsorber if the bypass valve is closed.

16. The method of claim 10, further comprising opening a bypass valve if the purge of the $NO_x$ adsorber is complete, wherein the purge is complete if an amount of nitrogen dioxide in the $NO_x$ adsorber is below a predetermined nitrogen dioxide threshold.

17. The method of claim 10, further comprising initializing a catalyst warm up strategy if an engine is in a catalyst light off mode.

18. The method of claim 17, further comprising activating an air pump if the engine is in the catalyst light off mode.

* * * * *